United States Patent

Bloom

[15] 3,707,068
[45] Dec. 26, 1972

[54] MULTISTAGE LIQUID AND GAS SEPARATOR

[72] Inventor: Carl Bloom, Springfied, Mass.

[73] Assignee: Worthington Corporation, Holyoke, Mass.

[22] Filed: Feb. 25, 1970

[21] Appl. No.: 13,872

[52] U.S. Cl. .................. 55/337, 55/396, 55/457, 55/481
[51] Int. Cl. ............................................ B01d 45/12
[58] Field of Search.................... 55/337, 456–457, 55/453, 447, 315, 318–319, 320–333, 392, 394, 396, 447–450, 458–459, 497–498, 500, 434, 235, 481, DIG. 23, 461; 210/304

[56] References Cited

UNITED STATES PATENTS

| 1,344,146 | 6/1920 | Peck.................................55/461 X |
| 2,785,055 | 3/1957 | Redcay............................55/462 X |
| 2,828,831 | 4/1958 | Boretti et al....................55/392 X |
| 3,347,026 | 10/1967 | Zankey.............................55/481 X |
| 3,386,230 | 6/1968 | Riesberg et al..................55/457 X |
| 2,753,954 | 7/1956 | Tinker..............................55/450 X |
| 612,207 | 10/1898 | Kincaid et al....................55/457 X |
| 2,659,450 | 11/1953 | Baird..................................55/396 |
| 2,848,060 | 8/1958 | McBride et al..................55/325 |
| 3,394,533 | 7/1968 | Yi Sheng Li et al.............55/337 |
| 3,538,684 | 11/1970 | Esterhoy..........................55/457 X |
| 3,541,764 | 11/1970 | Astrom.............................55/337 X |
| 1,791,732 | 2/1931 | Manchester....................55/337 UX |

FOREIGN PATENTS OR APPLICATIONS 958,182   5/1964   Great Britain.........................55/457

Primary Examiner—Tim R. Miles
Assistant Examiner—Vincent Gifford
Attorney—Fishman and Van Kirk

[57] ABSTRACT

A liquid and gas separator having a primary stage including an agglomerator cartridge and a secondary stage providing the discharge path for the gas and liquid mixture passing from the primary state. The secondary stage includes a centrifugal separator with a flow reversing path and a combined minimum pressure discharge nozzle and collector chamber through which the separated gas and liquid are individually removed from the separator.

9 Claims, 2 Drawing Figures

PATENTED DEC 26 1972

3,707,068

INVENTOR
CARL BLOOM

BY Fishman & Van Kirk
Attorneys 3,707,068

MULTISTAGE LIQUID AND GAS SEPARATOR

A related liquid and gas separator is shown in my copending U.S. Pat. application Ser. No. 14,306 filed Feb. 26, 1970 having the same assignee, now U.S. Pat. No. 3,654,748.

BACKGROUND OF THE INVENTION

1. Field of the Invention

The invention relates to the field of liquid and gas separators which employ both agglomerating and centrifugal separating stages through which the liquid and gas mixture passes serially during the separating process.

2. Description of the Prior Art

Liquid and gas separators which employ a plurality of stages for filtering or separating the liquid and gas mixture are well known in the art. Such devices have a multitude of applications wherever either a purified gas mixture, or a purified liquid or both purified liquid and gas are desired. An example of the latter situation is commonly found in rotary vane or screw-type gas compressors where lubricating oil is injected into the compressor to cool and lubricate the compressor as it is operating. The high pressure air leaving the compressor is laden with a great deal of the lubricating oil. It is desirable to have the air purified for use with various pneumatic devices, such as air hammers, and to have the oil returned to a reservoir for recirculation through the lubricating system of the compressor.

Liquid and gas separators which are particularly adapted to air and oil mixtures often employ an agglomerator cartridge through which the oil laden air is passed. The cartridge causes the finely divided, atomized particles of oil to agglomerate in large droplets. The heavier droplets react more significantly to inertial forces than the atomized particles and consequently larger quantities of oil can be more easily removed from an air flow by centrifugal separators. If the air stream has a fairly high velocity, the stream may recapture atomized particles from the previously agglomerated oil. For these reasons efficient centrifugal separators used in series with the agglomerator cartridges are desirable.

SUMMARY OF THE INVENTION

The present invention relates to an improved, multistage liquid and gas separator. The multistage separator employs an agglomerator cartridge and centrifugal separators which receive the gas and liquid mixture after it has passed through the cartridge.

The agglomerator cartridge which forms the principal portion of the initial or primary separating stage is mounted in a tank that receives the liquid and gas mixture. The cartridge and its casing are mounted to one wall of the tank and, if desired, a removable cover plate may be added to the external side of the wall to allow access to the agglomerator cartridge for inspection or replacement.

The centrifugal separator in this invention is the final or secondary separating stage and is an improved centrifugal separator which receives the liquid and gas mixture after it has passed through the agglomerator cartridge. The separator includes a conduit connected to the outlet from the cartridge. Sharp bends are included in the conduit in order to throw the agglomerated droplets against the walls of the conduit from which it may drain by gravity independently of the flowing gas.

Downstream from the sharp bends, the flowing gas passes through a further centrifugal separator stage having a tapered, hollow center body surrounded externally with helical swirl vanes which will throw entrained liquid against the side walls of the conduit. The annular passageway formed between the tapered center body and the inner surface of the conduit terminates in a collector chamber where the gas is decelerated and the liquid particles are carried by inertia against the walls of the chamber. From the collector chamber the gas flow is turned 180° back into the hollow center body where it is again turned 180° into the entrance of a discharge tube. The tube may include a venturi portion for maintaining a desired minimum operating pressure within the tank.

Liquid particles which are thrown against the walls of the conduit due to the centrifugal forces and inertial forces drain into the lower portion of the collector chamber by gravity. A scavenging duct leaving the collector chamber removes the collected liquid. The flowing gas is now substantially free of all suspended liquid particles and passes through the discharge nozzle for use as desired.

The initial and final separating stages are preferably both supported by the same wall of the tank. Such construction permits easy access to both the separators and the connections to the tank.

DESCRIPTION OF THE PREFERRED EMBODIMENTS

Figure 1:
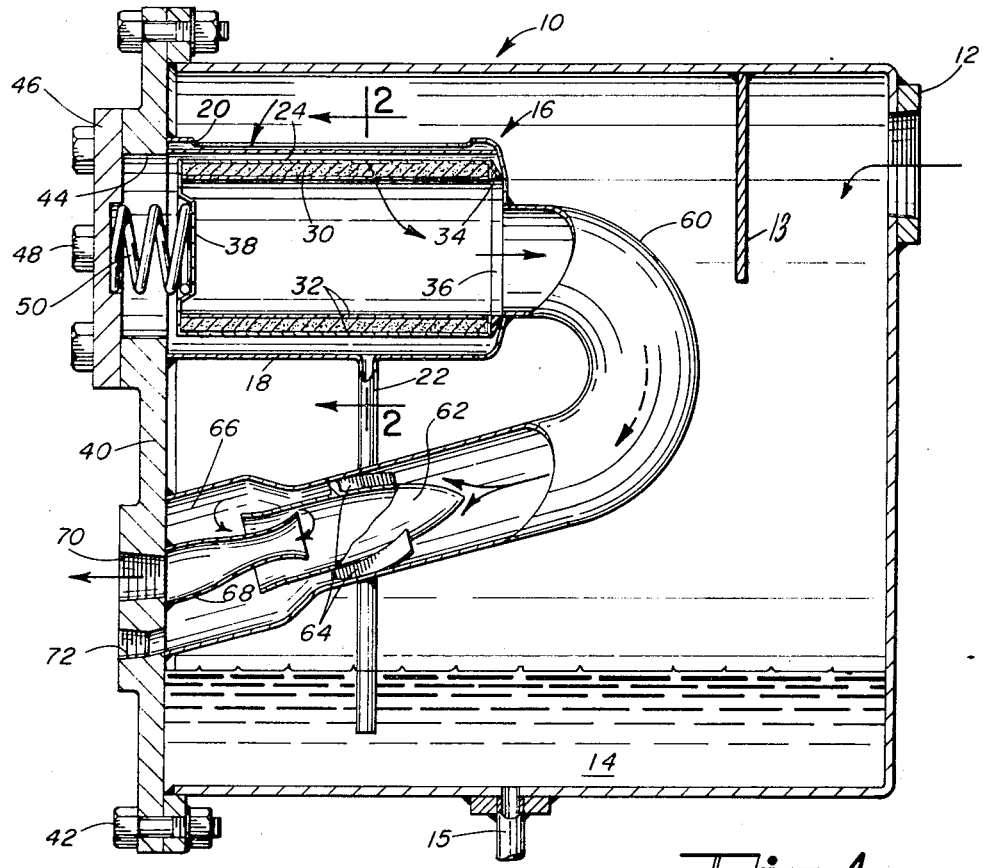
FIG. 1 is a sectional view of a tank including a primary separating stage with an agglomerating cartridge and the secondary centrifugal separating stage forming the discharging passageway for the mixture from the primary stage.

Reference to FIG. 1 shows my improved liquid and gas separator in a sectional view.

As indicated by the arrows the liquid and gas mixture enters the tank 10 through a fitting 12 connected to one end wall of the tank and is deflected downwardly by baffle 13. The fitting 12 may be connected to the discharge manifold of a rotary vane compressor in which event the tank would be more commonly known as a demister tank for separating an air and oil mixture. Heavy particles of liquid entrained in the gas stream entering fitting 12 may immediately fall to the pool 14 of liquid in the bottom of the tank as the deflected gas stream decelerates. If desired, the pool 14 may be drained through a convenient outlet 15 or simply stored in the tank 10 for removal at periodic intervals.

Figure 2:
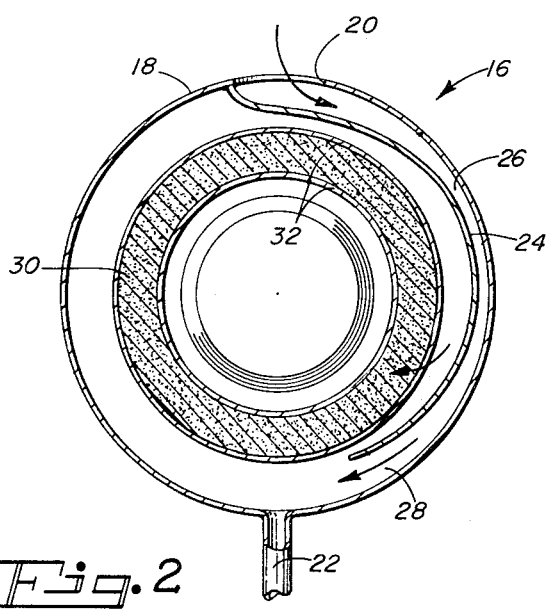
FIG. 2 is a sectional view of the primary separating stage along the lines 2—2 of FIG. 1.

Once in the tank, the liquid and gas mixture drifts toward the primary separator generally designated by numeral 16. This separator has a cylindrical outer casing 18 including a longitudinal inlet slot 20 at its top side and a liquid drain line 22 at the bottom side. As seen more clearly in FIG. 2, the mixture entering the casing 18 is forced to follow the inner surface of the casing 18 by a baffle 24 which runs circumferentially from the inlet 20 along one side of the casing 18. The baffle 24 is specially shaped to form a venturi section 26 and a diffuser section 28. The venturi section 26 causes the inflowing mixture to be accelerated to a higher speed as it follows the cylindrical inner wall of casing 18. Some liquid particles entrained in the mixture are centrifuged against the inner surface of casing 18 and eventually flow by gravity to the drain line 22. The diffuser section 28 decelerates the mixture and therefore prevents the centrifuged liquid from being recaptured or aspirated in a high velocity gas stream. The mixture will continue to circulate around the inner surface of casing 18 and baffle 24 and thusly will continue the centrifuging process. Eventually, the mixture passes through an agglomerator cartridge 30 centrally positioned within the casing 18. The cartridge 30 consists of sheets of porous, filter material made from natural, plastic, glass or other fibers and causes the finely divided particles to coalesce in droplets. The cartridge may be held in its cylindrical shape by means of a perforated cage structure 32. At one end of the cartridge in FIG. 1 a seal 34 prevents the mixture from bypassing the cartridge and flowing directly to the centrally located outlet 36 in an end wall of casing 18. At the opposite end of the cartridge a closed cap 38 forming a part of the cage 32 seals the internal side of the cartridge from the external side.

The casing 18 is mounted to the end wall 40 of the tank 10 by welds or any other convenient attachment. The end wall 40 may be a removable end wall secured to the remainder of the tank 10 by clamping bolts 42. Alternately, the wall 40 may be welded directly to the remainder of the tank to provide a less expensive construction. An access hole 44 and a cover plate 46 held by a plurality of bolts 48 to the wall 40 are coaxially aligned with the cylindrical casing 18. A cartridge spring 50 is sandwiched between the cover plate 46 and the cap 38 and urges the cartridge 30 with seals 34 into contact with the wall of casing 18 surrounding the outlet 36. The removable cover plate 46 permits the cartridge 30 to be removed for inspection or replacement.

It will be understood that the centrifuging action of the baffle 24 removes a portion of the liquid entrained in the mixture ingested by the primary separator 16. The centrifuged liquid flows by gravity to drain line 22. Drain line 22 extends from the separator 16 to below the surface of pool 14 since the slightly higher pressure outside of the casing 18 would inhibit the draining of centrifuged liquid through a drain hole in the bottom of casing 18. A short column of liquid above the pool surface in the line 22 maintains the lower pressure at the junction of the casing 18 and the line 22 while the separator 16 is in operation.

Another portion of the liquid ingested by the separator 16 is agglomerated in the cartridge 30 and may form droplets large enough to be pulled by gravity from the cartridge through the drain line 22. The remaining liquid agglomerated on cartridge 30 is recaptured in droplets by the gas flow as part of the first stage separating process. The recaptured portion of the liquid continues with the gas through the outlet 36. For this reason my invention includes an improved secondary separator forming the discharge mechanism from the primary separator 16.

The secondary separator receives the mixture with agglomerated droplets in a conduit 60 connected to the casing 18 at the outlet 36. Gas entering the conduit 60 is initially turned through a sharp bend subtending an angle preferably greater than 90°. Some liquid carried by the mixture at this point will be thrown against the outer wall of the conduit 60 by the centrifuging action. This liquid will adhere to the wall and flow by gravity to lower portions of the conduit.

After passing through the sharp bend, the mixture enters a straight portion of the conduit 60 and meets a tapered hollow center body 62. The center body 62 separates the flow as indicated by the arrows and accelerates the flow through the annular passageway formed between the body 62 and inner surface of conduit 60. The center body 62 is supported within the conduit 60 by means of helical vanes 64 which swirl the accelerated flow. The combined acceleration and swirling by the body 62 and vanes 64 centrifuges the entrained liquid against the walls of conduit 60 where it can adhere and flow to a collecting chamber 66 downstream of the annular passageway surrounding the center body 62. As the gas enters the collector chamber 66, it will be rapidly decelerated from the high velocity in the annular passageway and further separation will be caused by the inertial forces carrying the oil droplets against the end wall 40. In addition as indicated by the arrows, the gas is forced to reverse its flow direction a first time to enter the hollow skirt section of body 62. A second flow reversal and consequently a still further separation due to inertial forces occurs within the hollow skirt section of body 62 where the gas enters a discharge nozzle 68. The nozzle 68 leads directly to discharge aperture 70 in end wall 40. The discharge nozzle 68 has a venturi form in which the throat is specifically sized to provide chocked flow at a desired minimum upstream pressure. For various reasons it may be preferred to maintain a pressure no less than a given value at some point upstream of the nozzle 68 such as the oil reservoir which feeds oil to the rotary compressor that discharges the mixture into tank 10. The discharge nozzle 68 will maintain the desired pressure at choked flow regardless of the pressure at discharge 70. This nozzle and its function are described in greater detail in U.S. Pat. No. 3,318,514 issued May 9, 1967 to R. O. Garbus.

Through this series of centrifuging, decelerating and flow reversing actions large quantities of the gas-borne liquid will be thrown against the wall of my discharging mechanism. The liquid will eventually drain by gravity into the lowe portion of the collector chamber 66 from which it will be removed through scavenging port 72 in end wall 40. As a result, the gas leaving the tank 10 at discharge port 72 will be substantially free of entrained liquid.

It will be understood that various modifications and substitutions can be made in the particular embodiment shown. For example, it is not essential to the separating function that all components be mounted on the coverplate 40. Such construction, however, permits the discharging connections and the access plate 46 to be located at one side of the tank which may be conveniently exposed externally for accessibility. It may be advantageous to include more than one bend in conduit 60 between the outlet 36 and the center body 62. The discharge nozzle 68 need not be a minimum pressure nozzle but may be a constant cross section tube simply extending within the skirt section of body 62. Furthermore, the entrance of the nozzle 68 may be located closer to or immediately outside of the opening of the skirt in center body 62 rather than deep within the body as shown.

Having thus described my invention, I claim:

1. A liquid and gas separating device comprising:
   a. a housing defining a chamber for receiving a liquid and gas mixture and having an end member including a gas discharge port;
   b. a primary separator mounted to the end member within the chamber and having a mixture inlet, a liquid outlet, and a mixture outlet; and
   c. a secondary separating and discharging means including:
      1. a conduit connected with the mixture outlet of the primary separator;
      2. a centrifugal separator interposed in the conduit and including a hollow, aerodynamically smooth center body having a closed end facing upstream toward the primary separator and an open end facing downstream from the primary separator and a plurality of swirl vanes extending from the center body toward the inner surface of the conduit;
      3. a gas discharge tube having a first end operatively connected with the gas discharge port in the end member of the housing and a second end extending into the conduit at least to a position adjacent to and axially aligned with the open end of the center body, the second end having cross-sectional dimensions smaller than the corresponding dimensions of the open end of the center body; and
      4. sealing means closing the conduit about the gas discharge tube.

2. The separating device of claim 1 wherein:
the second end of the gas discharge tube extends coaxially and partially within the open end of the center body.

3. The separating device of claim 1 wherein:
the end member of the housing is a removable end member; and
the secondary separating and discharging means is supported by the end member whereby the primary separator and the secondary separating and discharging means is supported by the end member whereby the primary separator and the secondary separating and discharging means can be removed with the end member.

4. The separating device of claim 1 wherein:
the end member of the housing additionally includes an access port and a removable external cover plate closing the access port; and
the primary separator is mounted to the end member opposite the external cover plate and includes an agglomerator cartridge removable through the access port.

5. The separating device of claim 1 wherein:
the sealing means closing the conduit around the discharge tube also includes a liquid drain port for removing liquid separated from the gas by the discharging mechanism.

6. The separating device of claim 1 wherein:
the discharge tube has a venturi section, the throat of the venturi section having a cross sectional area providing choked flow at a preselected inlet pressure of the demister tank.

7. The separating device of claim 1 wherein:
the secondary separating means conduit includes at least one curved portion subtending an angle greater than 90° at a position up-stream of said centrifugal separator.

8. The separating device of claim 1 wherein said primary separator mixture outlet faces into said chamber and away from said end member and said secondary separating means conduit contains a curved portion which defines an arc in excess of 90°.

9. The separating device of claim 1 wherein said primary separator comprises:
convergent-divergent passage means for accelerating the mixture delivered to said mixture inlet; and
agglomerator means connected between the divergent portion of said passage means and said mixture outlet.

* * * * *